United States Patent [19]
Metezeau et al.

[11] Patent Number: 5,785,249
[45] Date of Patent: Jul. 28, 1998

[54] SINGLE BAFFLE TURBOJET ENGINE THRUST REVERSER

[75] Inventors: Fabrice Henri Emile Metezeau; Guy Bernard Vauchel, both of Le Havre, France

[73] Assignee: Societe Hispano Suiza, Colombes, France

[21] Appl. No.: 676,085

[22] Filed: Jul. 2, 1996

[30] Foreign Application Priority Data

Jul. 5, 1995 [FR] France .................. 95 08092

[51] Int. Cl.$^6$ .................................. B64C 25/68
[52] U.S. Cl. ...................... 239/265.19; 244/110 B
[58] Field of Search ............... 234/265.25, 265.28; 244/110 B

[56] References Cited

U.S. PATENT DOCUMENTS

| | | |
|---|---|---|
| 3,640,468 | 2/1972 | Searle et al. |
| 3,844,482 | 10/1974 | Stearns .................. 244/110 B X |
| 4,030,687 | 6/1977 | Hapke .................. 244/110 B X |
| 5,058,828 | 10/1991 | Pillari .................. 244/110 B X |
| 5,110,069 | 5/1992 | Webb .................. 244/110 B |
| 5,181,676 | 1/1993 | Lair .................. 244/110 B |

FOREIGN PATENT DOCUMENTS

| | | |
|---|---|---|
| 0 150 649 | 1/1984 | European Pat. Off. |
| 0 131 079 | 1/1985 | European Pat. Off. |
| 0 345 834 | 6/1988 | European Pat. Off. |
| 1153561 | 3/1958 | France. |
| 2 601 077 | 1/1988 | France. |
| 2 622 928 | 5/1989 | France. |
| 2 638 783 | 5/1990 | France. |
| 2 672 339 | 8/1992 | France. |
| 2519530 | 11/1976 | Germany .................. 244/110 B |
| 2 075 447 | 11/1981 | United Kingdom. |

*Primary Examiner*—Kevin Weldon
*Attorney, Agent, or Firm*—Bacon & Thomas

[57] ABSTRACT

A thrust reverser for a turbojet engine is disclosed having a rear duct portion extending about a longitudinal axis with a rearmost edge lying in a plane extending at an oblique angle to the longitudinal axis. The thrust reverser also has a single thrust reverser baffle pivotally attached to the rear duct portion to move between a forward thrust position and a reverse thrust position. The single thrust reverser baffle has rearmost, planar edge which, in the forward thrust position, forms the downstream or rearmost end of the engine nozzle. The planar edge eliminates the aerodynamic losses of the known thrust reverser devices. The thrust reverser baffle also has an oblique edge that faces in a forward direction and is parallel to the rearmost edge of the rear duct portion when the baffle is in its forward thrust position. A forward portion of the single thrust reverser baffle conforms to the outer profile of the engine cowling when in the forward thrust position and is displaced away from the cowling when the baffle is moved to the reverse thrust positions such that the exhaust gases passing through the rear duct portion are diverted between the forward portion of the thrust reverser baffle and the rear duct portion so as to provide reverse thrust forces.

8 Claims, 4 Drawing Sheets

SINGLE BAFFLE TURBOJET ENGINE THRUST REVERSER

BACKGROUND OF THE INVENTION

The present invention relates to a turbojet engine thrust reverser, more particularly such a thrust reverser having a single movable baffle located on the rear portion of the engine to redirect the gases emanating from the engine into a reverse thrust direction.

Thrust reversers are, of course, well known in the art and may typically comprise a pair of clamshell-type baffles located at the rear portion of a turbojet engine to form both the outlet nozzle for the engine and to redirect the gases to provide a reverse thrust force. Another type of thrust reverser comprises a plurality of doors attached to a downstream portion of the engine cowling and, when moved into a reverse thrust position, redirect at least a portion of the gases in a forward direction to provide a reverse thrust force. French Patent 2 622 928 illustrates such a thrust reverser utilized in the bypass, or cold flow, duct of a turbofan-type turbojet engine. In this type of thrust reverser, the movable baffles, or doors, also constitute a portion of the exhaust nozzle when in the forward thrust positions. The downstream edges of such doors constitute the downstream or rearmost end of the outerwall of the bypass flow duct. In such known devices, the movable baffles, or doors, are pivotally mounted on a stationary portion of the engine structure.

FIG. 1 illustrates a typical clamshell-type baffle thrust reverser. As can be seen, the thrust reverser consists of a stationary upstream structure 1 affixed to the turbojet engine, or its cowling 2, the cowling having an inside wall 3 that forms the external boundary of an annular fluid flow circulation duct 4. The structure also comprises an external fairing 5 affixed to the inside wall 3 and two rearwardly extending side structures 6, located on opposite sides of the engine. Two movable baffles 7a and 7b are each pivotally attached to the stationary structures 6 so as to pivot about pivot axis 8. A control system (not shown) may also be supported on the side structures 6 and be connected to the movable baffles 7a and 7b. The rear most, or downstream ends 9 of the baffles 7a and 7b form the trailing or downstream edge of the exhaust nozzle and extend downstream from the fairing 5. As can be seen in FIG. 1, the respective downstream ends 9 of the baffles are not coplanar.

One of the problems of this known type of thrust reverser is that due to the non-coplanar downstream ends, it produces aerodynamic losses when in the forward thrust position, such losses being substantial and seriously degrading the desired performance of the engine. Solutions to this problem have been proposed, one of which is illustrated in French Patent 2 638 783. This document discloses the addition of displaceable, lateral flaps extending between the lateral sides of the rear portions of the baffles 7a and 7b in order to reduce the aerodynamic losses. However, such a proposed solution entails additional hinge devices and increased complexity of the thrust reverser resulting in decreased reliability and higher weight, factors which are to be avoided in aeronautical applications.

The thrust reverser illustrated in French Patent 2 601 077 utilizes a stationary structure located downstream of the clamshell-type thrust reverser baffles to provide an exhaust nozzle having a planar outlet. The extension of the duct and the increased complexity of the actuating mechanism to provide the baffle displacement while achieving adequate openings for the redirection of the thrust reversing gases also entail an increase in the weight of this structure.

French Patent 2 672 339 discloses a similar structure, in which the downstream structure translates to provide room for the pivoting movement of the movable baffles. Obviously, such a structure is inherently more complex and less reliable than is desired.

SUMMARY OF THE INVENTION

A thrust reverser for a turbojet engine is disclosed having a rear duct portion extending about a longitudinal axis with a rearmost edge lying in a plane extending at an oblique angle to the longitudinal axis. The thrust reverser also has a single thrust reverser baffle pivotally attached to the rear duct portion to move between a forward thrust position and a reverse thrust position. The single thrust reverser baffle has rearmost, planar edge which, in the forward thrust position, forms the downstream or rearmost end of the engine nozzle. The planar edge eliminates the aerodynamic losses of the known thrust reverser devices. The thrust reverser baffle also has an oblique edge that faces in a forward direction and is parallel to the rearmost edge of the rear duct portion when the baffle is in its forward thrust position. A forward portion of the single thrust reverser baffle conforms to the outer profile of the engine cowling when in the forward thrust position and is displaced away from the cowling when the baffle is moved to the reverse thrust positions such that the exhaust gases passing through the rear duct portion are diverted between the forward portion of the thrust reverser baffle and the rear duct portion so as to provide reverse thrust forces.

The single thrust reverser baffle is pivotally attached to the rear duct portion so as to pivot about an axis extending generally transversely to the longitudinal axis. The present invention eliminates the aerodynamic losses of the known thrust reversers when in their forward thrust mode by eliminating the non-coplanar trailing edges of the downstream end of the nozzle. The invention prevents such aerodynamic losses without incurring the drawbacks of a weight increase or a complexity increase as in the prior art devices.

DETAILED DESCRIPTION OF THE PREFERRED EMBODIMENT

Figure 2:
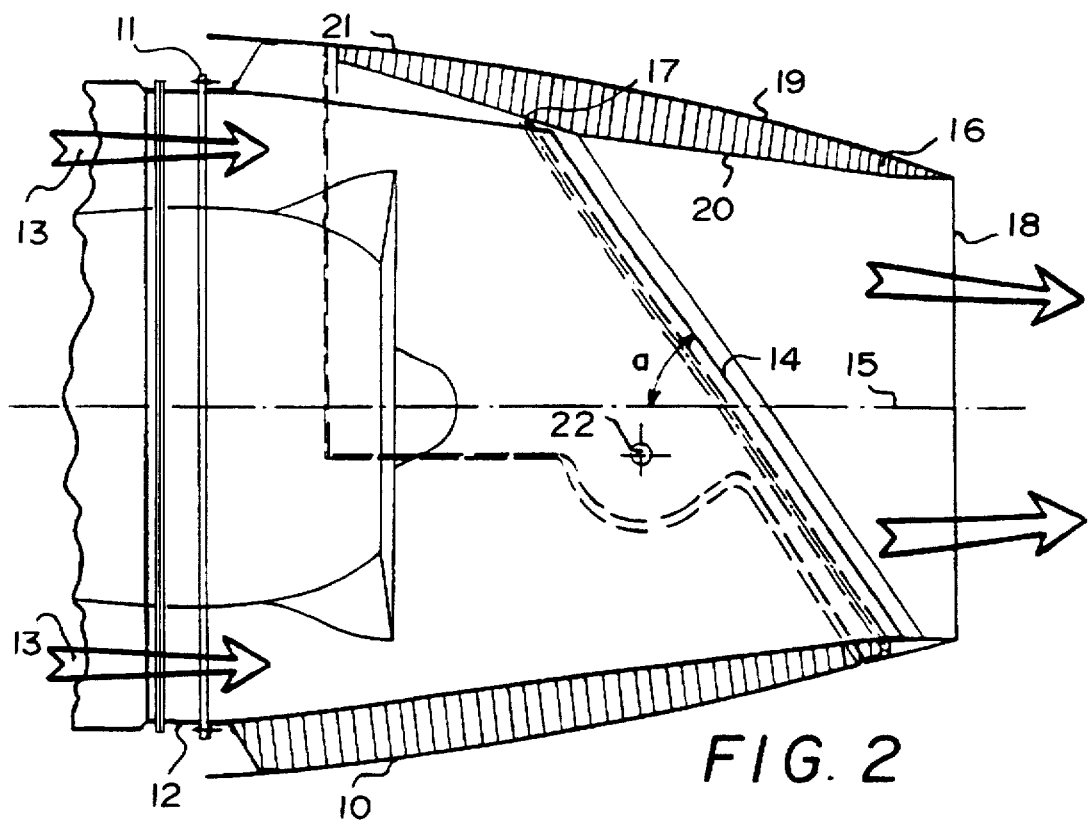
FIG. 2 is a partial, cross-sectional view of the thrust reverser according to the present invention with the single baffle in the forward thrust position.
Figure 3:
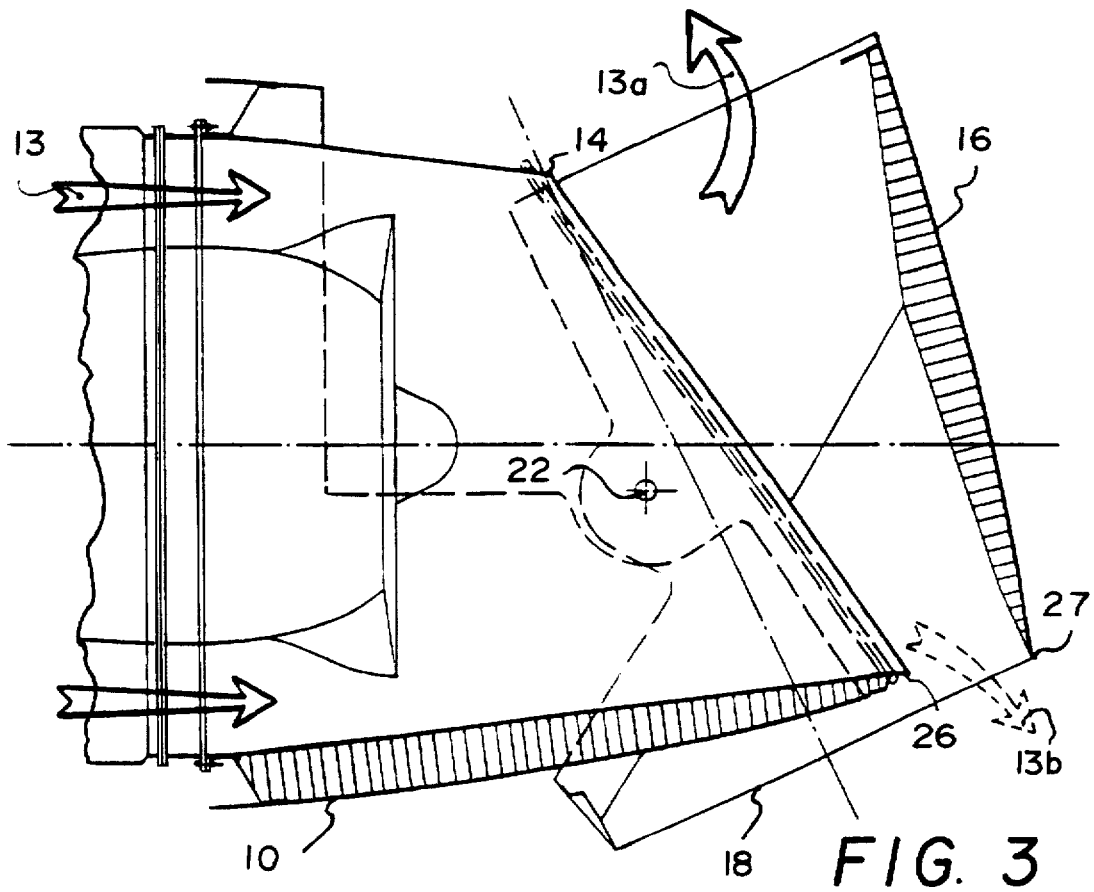
FIG. 3 is a view similar to FIG. 2, but illustrating the single thrust reverser baffle in its reverse thrust position.
Figure 4:
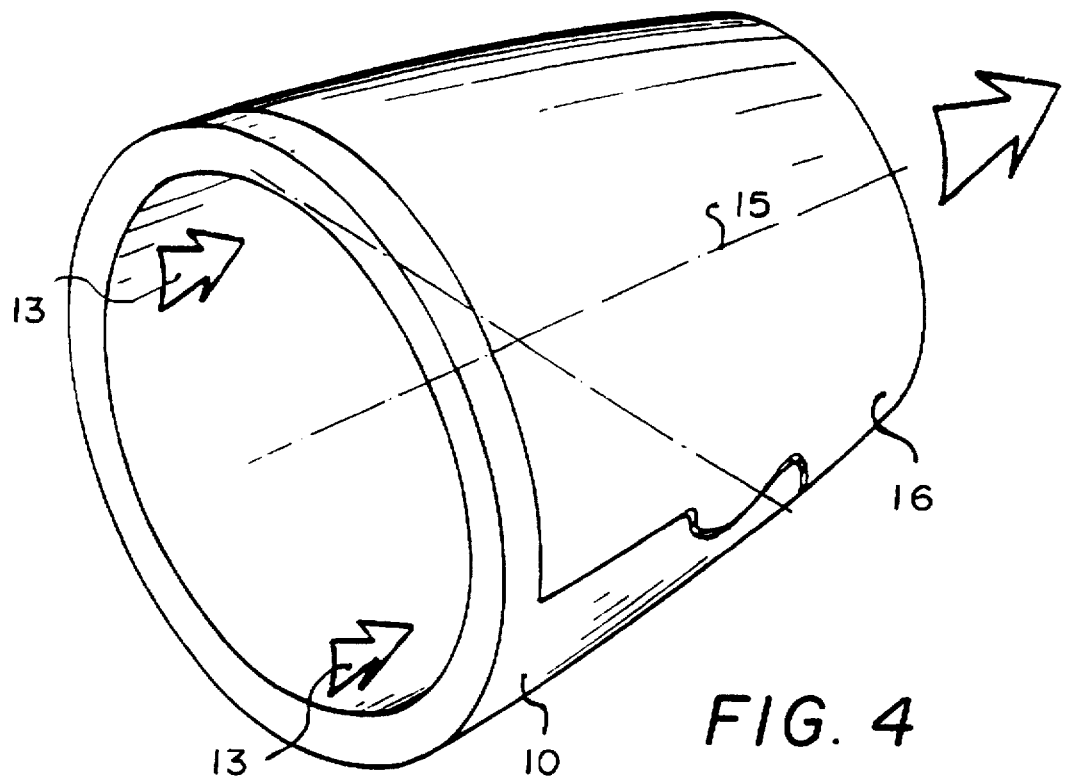
FIG. 4 is a perspective, schematic view of the thrust reverser according to the present invention with the baffle in the forward thrust position.

FIGS. 2 and 3 illustrate a thrust reverser according to the present invention with a stationary rear duct portion 10 affixed at 11 to an upstream or forward portion of a turbojet engine casing 12 which encloses the engine structure. As illustrated, the turbojet engine is a turbofan-type bypass engine and the casing 12 comprises the outer wall bounding the bypass flow duct through which the bypass gases flow as illustrated by arrows 13. The stationary rear duct portion 10 is located to form a downstream or rearmost extension of the casing 12. The rear duct portion 10 constitutes a part of the outer wall enclosing the fluid flow duct. The rear duct portion 10 comprises a rearmost or downstream end, with the forward and rear directions being defined according to the direction of gas flow, the forward direction being towards the left in FIGS. 2 and 3 and the rear direction being towards the right as illustrated in FIGS. 2 and 3. The rearmost edge 14 of the rear duct portion 10 lies in a plane extending at an oblique angle a to a longitudinal axis 15 of the turbojet engine. The oblique rearmost edge 14 enables one side of the rear duct portion 10 (in this particular orientation the lower side of the rear duct portion) to have a length greater than an opposite side (in this particular case the upper side) of the rear duct portion 10. The orientation of the rear duct portion may vary for each specific application in order to direct the thrust reversing gases away from any possible contact with the aircraft on which the engine is mounted.

A single thrust reverser baffle 16 is pivotally attached to the rear duct portion 10 so as to pivot about a pivot axis 22 extending generally transversely to the longitudinal axis 15. The thrust reverser baffle 16 has a forward portion 21 that, when in the forward thrust position, conforms to the contour of the engine cowling so as to provide an aerodynamic outer surface. The thrust reverser baffle 16 has a rearmost edge 18 forming the outlet of the turbojet engine nozzle (when the baffle is in the forward thrust position as illustrated in FIG. 2), the rearmost edge 18 lying in a plane that extends substantially perpendicularly to the longitudinal axis 15. By forming the rearmost edge 18 in a single plane, the present invention reduces the aerodynamic losses of the prior art devices.

The thrust reverser baffle 16 has an external surface 19 that conforms generally to the outer surface of the engine cowling and an inner wall 20 that forms a portion of the outer boundary of the exhaust gas duct.

The pivot axis 22 may be displaced away from the longitudinal axis 15 and, as illustrated in FIGS. 2 and 3, may be on the side of the longitudinal axis 15 towards the side of the rear duct portion 10 having the longest length.

Figure 1:
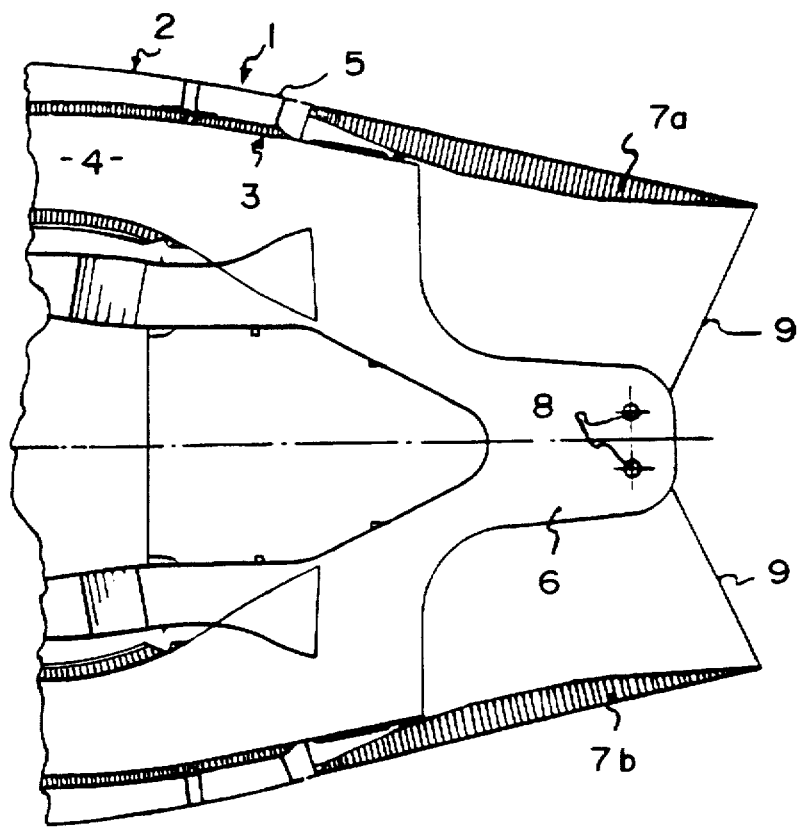
FIG. 1 is a partial, cross-sectional view of a known clamshell-type baffle thrust reverser.
Figure 7:
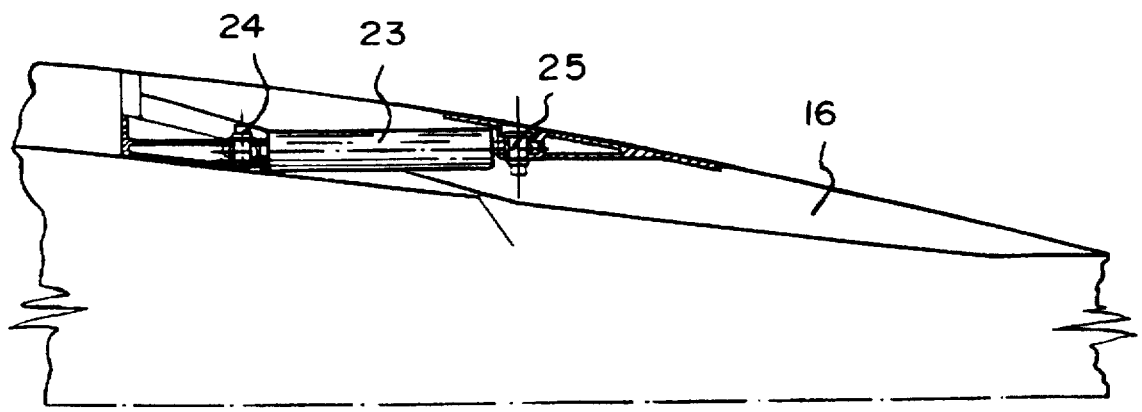
FIG. 7 is a partial, cross-sectional view taken along line VII—VII in FIG. 6 illustrating the attachment of a control device.
Figure 6:
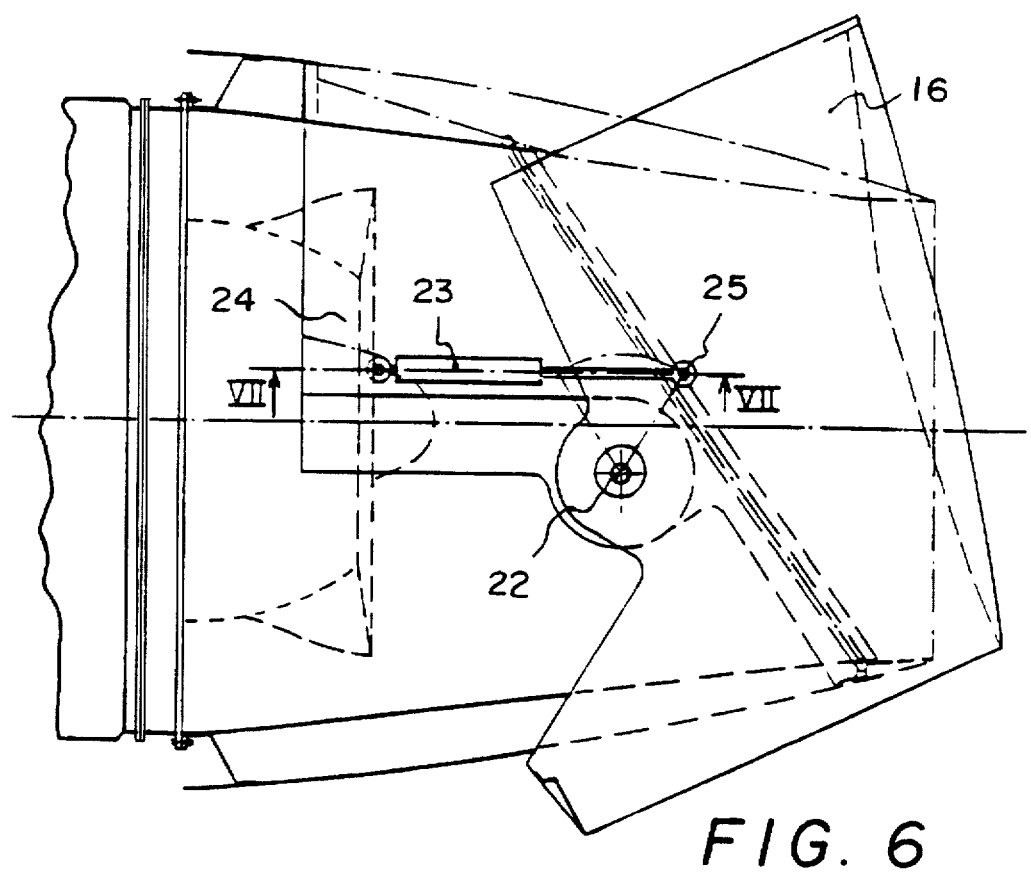
FIG. 6 is a schematic side view of the thrust reverser according to the present invention showing the thrust reverser baffle in both the forward and reverse thrust positions.

The single thrust reverser baffle 16 constitutes the displaceable portion of the thrust reverser and is connected to a displacement control system comprising means known per se, such as actuating cylinders having extendible and retractable piston rods. As illustrated in FIGS. 6 and 7, the actuators 23 may be located on opposite sides of the thrust reverser and may be housed on each side of the baffle 16 upstream of the pivot axis. The actuators 23 are connected between the movable baffle 16 and the stationary rear duct portion 10. Each actuator 23 is pivotally attached by pivot 24 to the rear duct portion 10 and by pivot 25 to the movable thrust reverser baffle 16. Other locations of the control actuators 23 may be utilized without exceeding the scope of this invention. For instance, a single actuator 23 could be connected to the upper (the top of the structure as illustrated in FIG. 6) portion of the rear duct portion 10 and the movable baffle 16.

Figure 5:
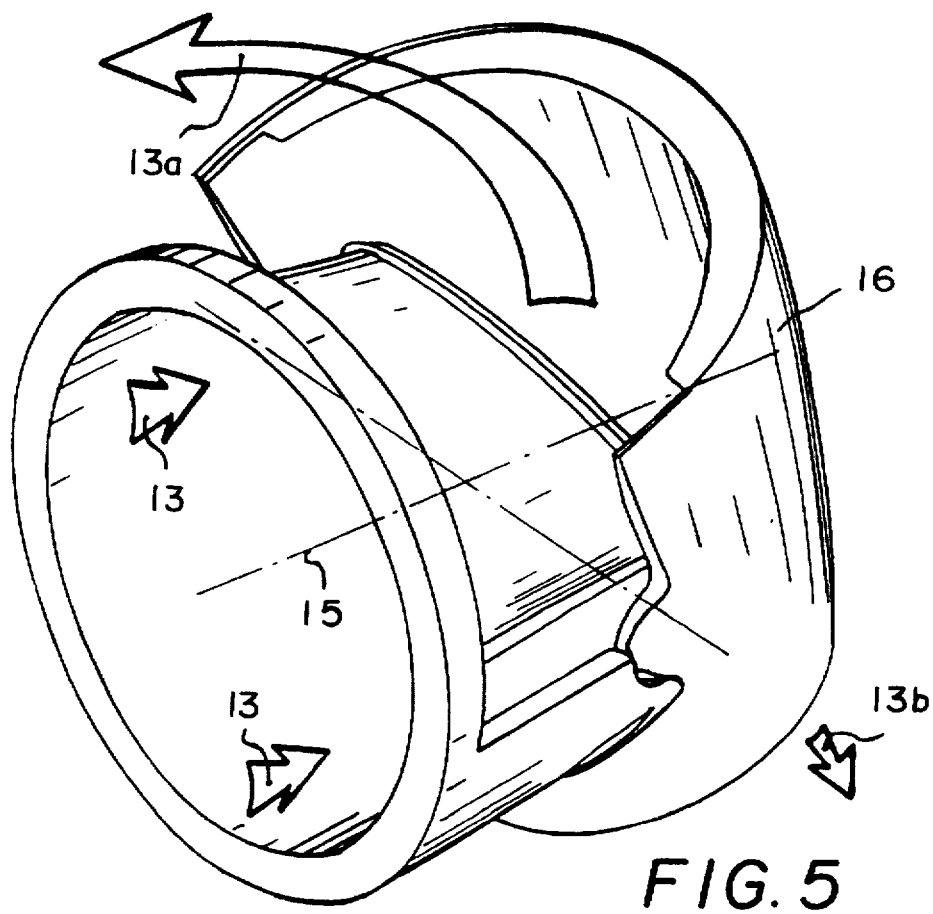
FIG. 5 is a view similar to FIG. 4 showing the thrust reverser baffle in the reverse thrust position.

FIGS. 3, 5 and 6 illustrate the thrust reverser baffle 16 in its reverse thrust position (the forward thrust position of the baffle 16 being shown by dashed and dotted lines in FIG. 6). As can be seen, any interference between the rearmost edge 18 forming the nozzle outlet and the rear duct portion 10 is avoided when the baffle 16 is pivoted between the forward thrust and reverse thrust positions. The structure is simplified insofar as it does not require any additional moving structure, thereby decreasing the weight and complexity in comparison to the prior art devices. The strength of the movable baffle 16 is also increased over the known devices because of the rearmost edge portion forming a continuous circle and by being held in place by the pivots attaching the baffle 16 to the rear duct portion 10. The strength of the structure is also improved for the forward thrust position due to the addition of one or more locking means in the forward portion of the baffle 16 (not shown) which insures secure locking of the baffle 16 to the rear duct portion 10. The structure also increases the nozzle's dimensional stability and geometry. The pivot attachments between the movable baffle 16 and the rear duct portion 10, as well as the pivoting attachments of the actuators 23 are located on a continuous structure that is free of any discontinuity to provide excellent stress absorption.

As best illustrated in FIGS. 3 and 5, a clearance exists between the rearmost edge 26 of the rear duct portion 10 and the rear 27 of the baffle 16 when the baffle is in the reverse thrust position. This allows a certain portion of the exhaust gases to pass through this clearance, as illustrated by arrow 13b. However, since a major portion of the gases are redirected outwardly in the direction of arrow 13a and because the flow 13b is minimized and is deflected in a generally radial direction away from the longitudinal axis 15, the overall thrust reversing forces remain acceptable to provide a sufficient thrust reversing force to the aircraft.

The thrust reverser according to the present invention utilizing a single reverser baffle 16 offers substantial advantages over the prior art devices and is easily assembled to an aircraft. In a supersonic aircraft, for instance, the main reverse thrust gas flow 13a may be directed upward and forwardly above the aircraft wing. In the case of an under wing installation of the turbojet engine, the main reverse thrust fluid flow 13a may be directed away from the aircraft fuselage and/or wing by properly choosing the orientation of the rear duct portion 10.

A seal 17 is interposed between the thrust reverser baffle 16 and the rear duct portion when the baffle 16 is in its forward thrust position. The seal, as best seen in FIG. 2, extends substantially parallel to the rearmost edge 14. The seal 17 eliminates the possibility of gas flow leakage between the baffle 16 and the rear duct portion 10, thereby increasing the engine efficiency. Also, less of a boundary is now present regarding the flow conduit between the rear duct portion and the baffle 16. These factors minimize aerodynamic losses when the thrust reverser is in the forward thrust mode.

The present invention allows the thrust reverser to either have a stable and self-closing baffle 16, or to have the gas flow assist in opening the baffle 16 during the transition from the forward thrust mode to the reverse thrust mode. Such design criteria can be achieved by changing the position of the pivot axis 22 or the position of the rearmost end of the stationary structure 10. Indeed, it is possible to make the resultant pressures acting on the baffle 16, when in the forward thrust position, to pass either upstream of the pivot axis 22, or downstream of the pivot axis 22.

Figure 8:
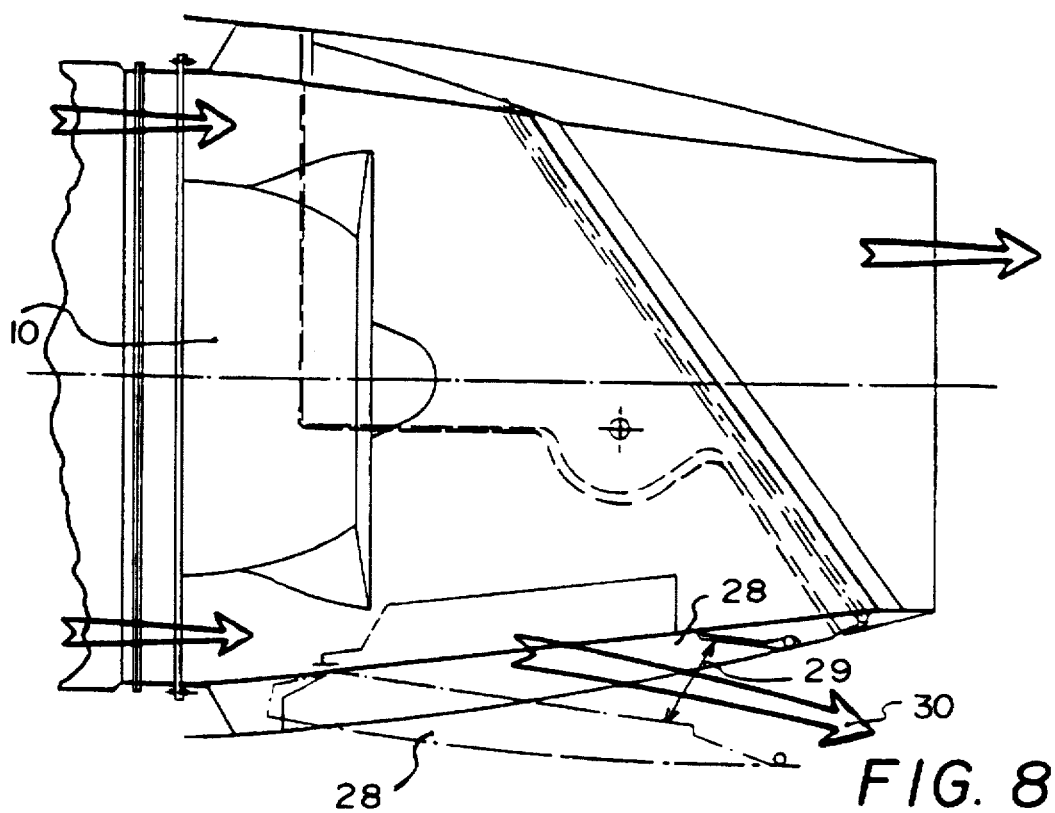
FIG. 8 is a side schematic view illustrating the thrust reverser according to the present invention utilized with a variable area nozzle.

The thrust reverser according to the present invention may also be utilized with a variable area nozzle, as illustrated in FIG. 8. In this embodiment, the rear duct portion 10 is formed with a movable door 28 movable between a closed position, as illustrated in solid lines, and an open position, illustrated by dashed and dotted lines wherein it forms an opening 29 with the rear duct portion 10. When the thrust reverser baffle 16 is in its forward thrust position, the opening 29 may be provided in the wall of the exhaust gas conduit to allow evacuation of a portion of the gas flow, illustrated by arrow 30. Obviously, one or more such doors and openings 29 may be formed as desired. The exhaust nozzle then may assume a variable cross-section. Such pivotable doors 28 in particular are housed in the zone of the rear duct portion 10 having the greatest axial length. Known means, not shown, may be utilized to move the door 28 between its open and closed positions.

The foregoing description is provided for illustrative purposes only and should not be construed as in any way limiting this invention, the scope of which is defined solely by the appended claims.

We claim:

1. A thrust reverser for a turbojet engine comprising:
   a) a duct with a longitudinal axis and having a first rearmost edge lying in a first plane extending at an oblique angle to the longitudinal axis; and,
   b) a single movable thrust reverser element having a second rearmost edge forming an exhaust opening and lying in a second plane, an oblique edge and a forward portion, the thrust reverser element pivotally attached to the duct so as to move about a pivot axis between a forward thrust position wherein the second plane extends generally perpendicularly to the longitudinal axis, the exhaust opening is located rearwardly of the rearmost edge of the duct, and the oblique edge is substantially parallel to the rearmost edge of the duct whereby combustion gases passing through the duct exit the turbojet engine through the exhaust opening formed by the second rearmost edge, and a reverse thrust position in which the forward portion of the element is displaced away from the duct so as to direct gases passing through the duct between the forward portion and rearmost edge of the duct.

2. The thrust reverser of claim 1 wherein the pivot axis extends substantially perpendicular to the longitudinal axis.

3. The thrust reverser of claim 1 wherein the single movable element is a thrust reverser baffle and further comprising seal means between the duct and the single thrust reverser baffle when the thrust reverser baffle is in the forward thrust position.

4. The thrust reverser of claim 3 wherein the seal means extends around the duct substantially parallel to the first rearmost edge.

5. The thrust reverser of claim 1 further comprising control means connected between the duct and the single thrust reverser element to move the element between the forward thrust and reverse thrust positions.

6. The thrust reverser of claim 5 wherein the control means comprises a single actuator connected between the duct forwardly of the pivot axis and the forward portion of the thrust reverser element.

7. The thrust reverser of claim 5 wherein the control means comprises a pair of actuators on opposite sides of the duct, and connected to the duct forwardly of the pivot axis.

8. The thrust reverser of claim 1 further comprising:
   a) an opening formed in the duct; and,
   b) a door movably attached to the rear duct portion so as to be movable between a first position wherein the door covers the opening and a second position wherein the door uncovers the opening.

* * * * *